United States Patent
Heo et al.

(10) Patent No.: US 10,433,001 B2
(45) Date of Patent: Oct. 1, 2019

(54) BROADCAST RECEIVING APPARATUS AND CONTROL METHOD THEREOF

(71) Applicant: Samsung Electronics Co., Ltd., Suwon-si, Gyeonggi-do (KR)

(72) Inventors: Jongman Heo, Suwon-si (KR); Byoungwhan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/216,051

(22) Filed: Dec. 11, 2018

(65) Prior Publication Data
US 2019/0191207 A1    Jun. 20, 2019

(30) Foreign Application Priority Data
Dec. 14, 2017 (KR) .......................... 10-2017-0172488

(51) Int. Cl.
| | |
|---|---|
| *H04N 5/50* | (2006.01) |
| *H04N 5/44* | (2011.01) |
| *H04N 21/426* | (2011.01) |
| *H04H 40/18* | (2008.01) |
| *G06F 8/65* | (2018.01) |

(52) U.S. Cl.
CPC ........... *H04N 21/4263* (2013.01); *G06F 8/65* (2013.01); *H04H 40/18* (2013.01); *H04N 5/50* (2013.01)

(58) Field of Classification Search
CPC .... H04N 21/4263; H04N 5/50; H04N 5/4401; H04N 5/44; H04N 5/455; G06F 8/65; H04H 40/18

USPC ....... 348/731–733, 725–728; 725/59, 68, 85, 725/100, 131, 139, 151; 455/178.1, 455/187.1, 191.1
See application file for complete search history.

(56) References Cited

U.S. PATENT DOCUMENTS

| | | | |
|---|---|---|---|
| 7,089,550 | B2 | 8/2006 | Bakke et al. |
| 7,929,062 | B2 | 4/2011 | Oh |
| 2003/0177486 | A1 | 9/2003 | Bakke et al. |
| 2005/0166246 | A1 | 7/2005 | Calmels et al. |
| 2006/0061694 | A1 | 3/2006 | Oh |
| 2006/0294574 | A1 | 12/2006 | Cha |
| 2007/0067820 | A1 | 3/2007 | Cha |
| 2008/0129887 | A1 | 6/2008 | Kim |

(Continued)

FOREIGN PATENT DOCUMENTS

WO    2016/177406    11/2016

OTHER PUBLICATIONS

Extended European Search Report dated Mar. 6, 2019 in European Patent Application No. 18211582.4.

(Continued)

*Primary Examiner* — Sherrie Hsia
(74) *Attorney, Agent, or Firm* — Staas & Halsey LLP

(57) ABSTRACT

A broadcast receiving apparatus includes a plurality of tuners configured to be tuned for a broadcast signal; and a processor configured to: make a plurality of operations be assigned to and performed in the plurality of tuners, the plurality of operations being different from one another and being performed in sequence to receive content involved in the broadcast signal, make the assignment of the plurality of operations to the plurality of tuners be varied depending on progress with the plurality of operations, and perform control to receive the content from the broadcast signal.

20 Claims, 13 Drawing Sheets

(56) References Cited

U.S. PATENT DOCUMENTS

| | | | |
|---|---|---|---|
| 2012/0133840 A1* | 5/2012 | Shirasuka | H04B 7/08 |
| | | | 348/732 |
| 2015/0172753 A1 | 6/2015 | Yu et al. | |
| 2015/0244964 A1 | 8/2015 | Kim et al. | |
| 2017/0134798 A1 | 5/2017 | Seo et al. | |

OTHER PUBLICATIONS

Jaehyeon Bae, et al., "Alternative resource URI for dynamic update", ISO/IEC JTC1/SC29/WG11, May 2016, 6 pages.

* cited by examiner

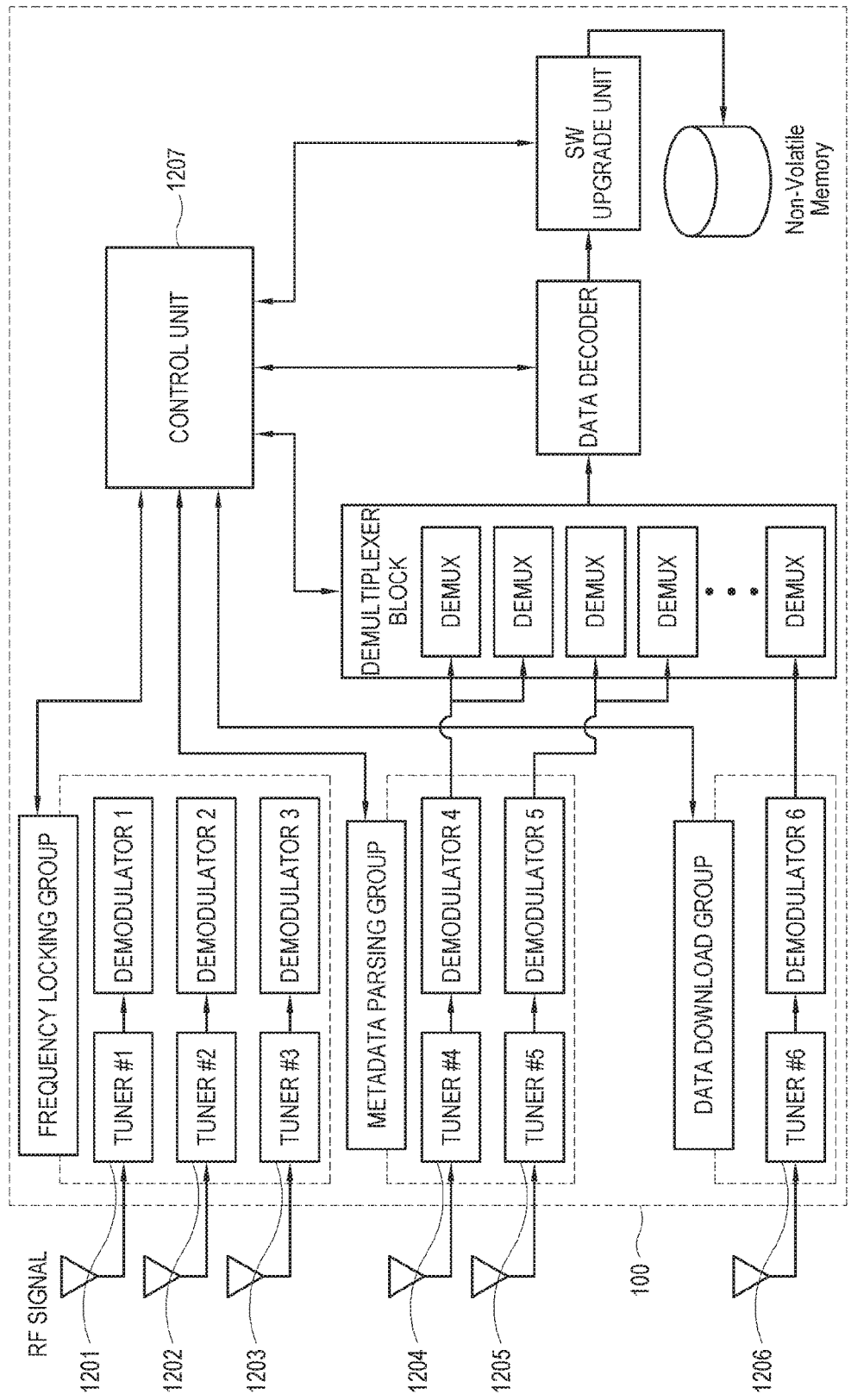

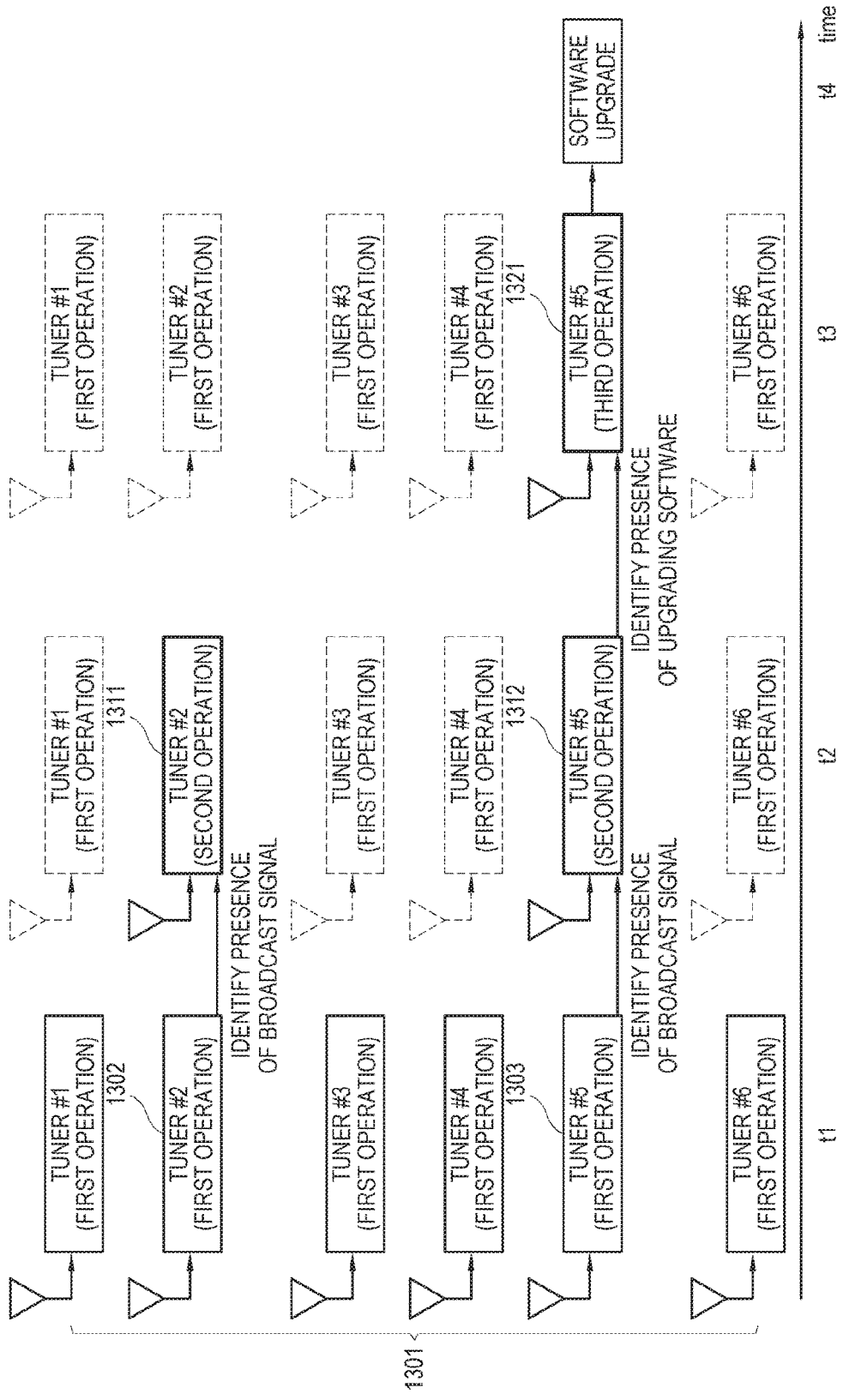

BROADCAST RECEIVING APPARATUS AND CONTROL METHOD THEREOF

CROSS-REFERENCE TO RELATED APPLICATIONS

This application is based on and claims priority under 35 U.S.C. § 119 to Korean Patent Application No. 10-2017-0172488, filed on Dec. 14, 2017 in the Korean Intellectual Property Office, the disclosure of which is incorporated by reference herein in its entirety.

BACKGROUND

1. Field

Apparatuses and methods consistent with the present disclosure relate to a broadcast receiving apparatus and a control method thereof, and more particularly to a broadcast receiving apparatus and a control method thereof, in which a receiving process for content contained in a broadcast signal is improved in speed.

2. Description of the Related Art

A broadcast receiving apparatus uses a tuner to receive a broadcast signal corresponding to a predetermined frequency band and content contained in the broadcast signal.

Conventionally, most of broadcast receiving apparatuses include only a single tuner. With recent diversification of functions supported by the broadcast receiving apparatus, a broadcast receiving apparatus with a plurality of tuners has been on the rise.

However, the plurality of tuners is not fully utilized in receiving content contained in the broadcast signal.

SUMMARY

Accordingly, an aspect of one or more exemplary embodiments is to provide a broadcast receiving apparatus in which a receiving process for content contained in a broadcast signal is improved in speed by efficiently utilizing a plurality of tuners.

In accordance with one exemplary embodiment, there is provided a broadcast receiving apparatus comprising: a plurality of tuners configured to be tuned for a broadcast signal; and a processor configured to: make a plurality of operations be assigned to and performed in the plurality of tuners, the plurality of operations being different from one another and being performed in sequence to receive content involved in the broadcast signal, make the assignment of the plurality of operations to the plurality of tuners be varied depending on progress with the plurality of operations, and perform control to receive the content from the broadcast signal.

The plurality of operations comprises a primary operation and a secondary operation performable after the primary operation is completed, and the processor makes the primary operation be assigned to and carried out in two or more tuners, and makes the secondary operation be assigned to and carried out in at least one tuner of the two or more tuners based on one of the two or more tuners finishing the primary operation assigned thereto, regardless of whether or not the other tuner of the two or more tuners finishes the primary operation assigned thereto.

The content comprises upgrading software for the broadcast receiving apparatus, and the plurality of operations comprises at least one operation among a first operation for scanning a frequency involving the broadcast signal, a second operation for identifying whether the upgrading software is involved in a predetermined frequency, and a third operation for downloading the upgrading software at the predetermined frequency.

The processor makes the assignment of the plurality of operations to the plurality of tuners be varied depending on progress with software upgrading for the broadcast receiving apparatus.

The processor assigns the first operation to the plurality of tuners based on software upgrading being started.

The processor assigns the second operation to a first tuner among the plurality of tuners based on a frequency involving the broadcast signal being scanned by the first tuner.

The processor performs the assignment to make the tuners assigned with the second operation be fewer than the tuners assigned with the first operation.

The processor assigns the third operation to at least one among the plurality of tuners based on a frequency involving the upgrading software corresponding to the broadcast receiving apparatus being present.

The processor controls the plurality of operations assigned to the plurality of tuners to be carried out in parallel.

In accordance with one exemplary embodiment, there is provided a method of controlling a broadcast receiving apparatus with a plurality of tuners configured to be tuned for a broadcast signal, the method comprising: assigning a plurality of operations, which are different from one another and performed in sequence to receive content involved in the broadcast signal, to the plurality of tuners; varying the assignment of the plurality of operations to the plurality of tuners depending on progress with the plurality of operations; and receiving the content from the broadcast signal.

The plurality of operations comprises a primary operation and a secondary operation performable after the primary operation is completed, the assigning comprises assigning the primary operation to two or more tuners, the varying comprises assigning the secondary operation to at least one tuner of the two or more tuners based on one of the two or more tuners finishing the primary operation assigned thereto, regardless of whether or not the other tuner of the two or more tuners finishes the primary operation assigned thereto.

The content comprises upgrading software for the broadcast receiving apparatus, and the plurality of operations comprises at least one operation among a first operation for scanning a frequency involving the broadcast signal, a second operation for identifying whether the upgrading software is involved in a predetermined frequency, and a third operation for downloading the upgrading software at the predetermined frequency.

The varying comprises varying the assignment of the plurality of operations to the plurality of tuners depending on progress with software upgrading for the broadcast receiving apparatus.

The varying comprises assigning the first operation to the plurality of tuners based on software upgrading being started.

The varying comprises assigning the second operation to a first tuner among the plurality of tuners based on a frequency involving the broadcast signal being scanned by the first tuner.

The varying comprises performing the assignment to make the tuners assigned with the second operation be fewer than the tuners assigned with the first operation.

The varying comprises assigning the third operation to at least one among the plurality of tuners based on a frequency involving the upgrading software corresponding to the broadcast receiving apparatus being present.

The control comprises controlling the plurality of operations assigned to the plurality of tuners to be carried out in parallel.

In accordance with one exemplary embodiment, there is provided a computer program product including a computer readable storage medium having a computer program stored thereon, which, when executed by a computing device, causes the computing device to execute the control method of the electronic apparatus, as described above.

The computer program may be stored in the computer readable storage medium in a server and wherein the computer program is downloaded over a network to the computing device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 illustrates a configuration of a broadcast receiving apparatus according to yet another exemplary embodiment; and FIG. 13 illustrates change in tuner assignment in a broadcast receiving apparatus according to yet another exemplary embodiment.

DETAILED DESCRIPTION

Figure 1:
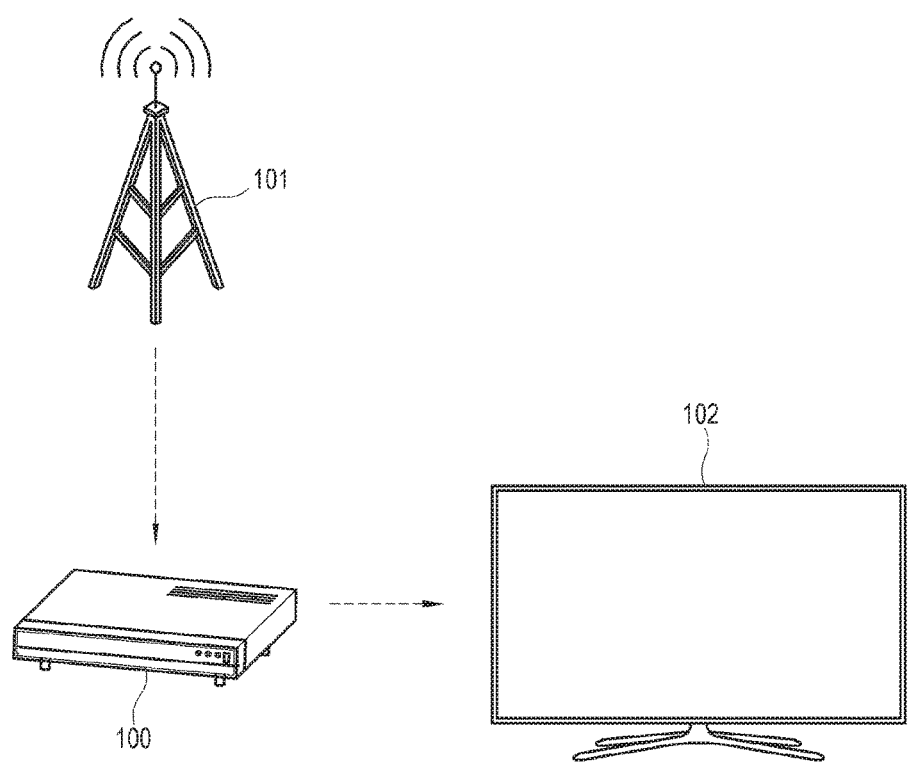
FIG. 1 illustrates a broadcast receiving apparatus according to one exemplary embodiment.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, "at least one" among a plurality of elements in the present disclosure represents not only all the plurality of elements but also each individual element excluding the other elements from the plurality of elements or all combinations thereof. In this specification, the expression of "configured to" may be for example replaced by "suitable for," "having the capacity to," "designed to," "adapted to," "made to," or "capable of" in accordance with circumstances. The expression of "configured to" may not necessarily refer to only "specifically designed to" in terms of hardware. Instead, the "device configured to" may refer to "capable of" together with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 illustrates a broadcast receiving apparatus 100 according to one exemplary embodiment. The broadcast receiving apparatus 100 according to one exemplary embodiment may for example be materialized by a set-top box. Further, a broadcast receiving apparatus 100 according to one exemplary embodiment may be materialized as mounted to the inside of a display apparatus, for example, a TV. However, the broadcast receiving apparatus 100 according to one exemplary embodiment may be materialized by any apparatus without limitations as long as it can receive a broadcast signal. As shown in FIG. 1, the broadcast receiving apparatus 100 according to one exemplary embodiment may receive and process a broadcast signal from a broadcasting station 101 and then transmit the processed signal to a display apparatus 102.

Figure 2:
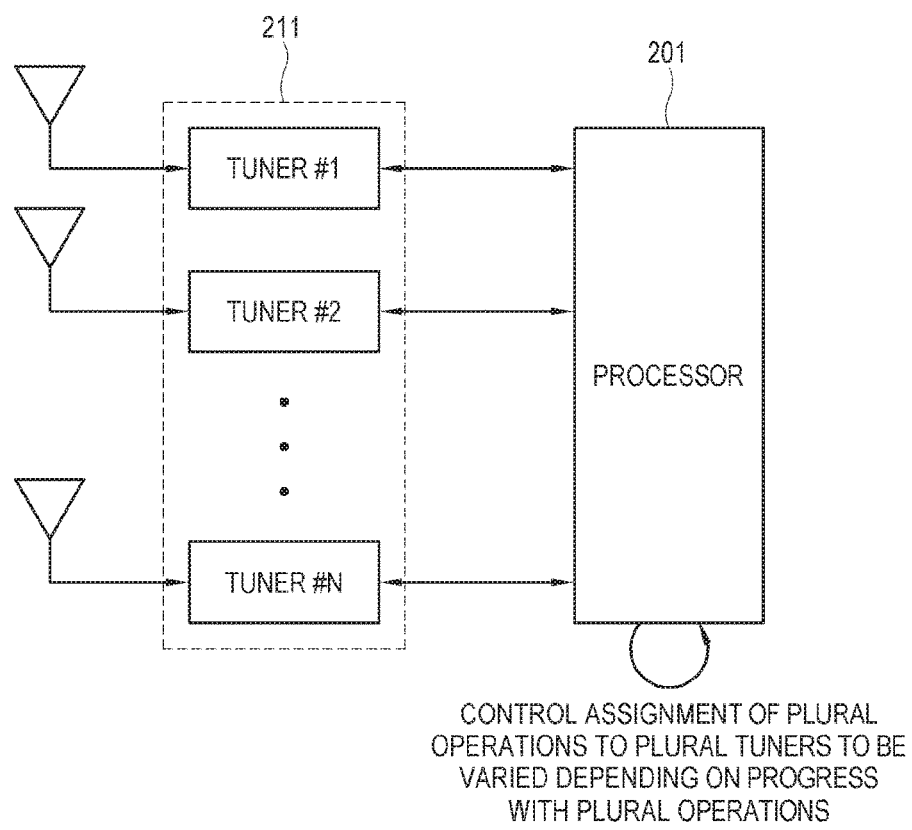
FIG. 2 illustrates a configuration of a broadcast receiving apparatus according to one exemplary embodiment.

FIG. 2 illustrates a configuration of the broadcast receiving apparatus 100 according to one exemplary embodiment. The broadcast receiving apparatus 100 according to one exemplary embodiment includes a processor 201 and a plurality of tuners 211. However, this configuration of the broadcast receiving apparatus 100 shown in FIG. 2 is merely an example, and the broadcast receiving apparatus 100 according to one exemplary embodiment may have another configuration. In other words, the broadcast receiving apparatus 100 according to one exemplary embodiment may include another element in addition to the configuration shown in FIG. 2, or exclude some elements from the configuration shown in FIG. 2.

The tuner 211 can receive a broadcast signal transmitted from the broadcasting station 101. The tuner 211 is tuned to a frequency or channel for a broadcast signal and receives the broadcast signal. When the broadcast signal is a digital signal, the tuner 211 may receive a broadcast signal stream, in which video, audio and data signals are encoded as one stream, from the broadcasting station 101.

The processor 201 may apply a signal process to the broadcast signal received in the tuner 211. The signal process to be performed by the processor 201 may for example include de-multiplexing for dividing an input stream into sub-streams for video, audio, data and the like signals; decoding corresponding to a video format of a video stream; de-interlacing for converting an interlaced-type video stream into a progressive type; scaling for adjusting a video stream to have a preset resolution; noise reduction for improving image quality; detail enhancement; frame refresh rate conversion; etc. However, the signal processes to be performed by the processor 201 are not limited to these examples. The processor 201 may be materialized by one or more hardware and/or software modules or combination thereof to perform the processes described above.

The processor 201 may perform control to operate general elements of the broadcast receiving apparatus 100. The processor 201 may include a control program (or instruction) for making such control operations, a nonvolatile memory in which the control program is installed, a volatile memory to which at least a part of the installed control program is loaded, and at least one processor or central processing unit (CPU) for executing the loaded control program. Further, such a control program may be stored in another electronic device as well as the broadcast receiving apparatus 100.

The control program may include a program(s) achieved in the form of at least one among a basic input/output system (BIOS), a device driver, an operating system (OS), a firmware, a platform, and an application program (or application). According to one exemplary embodiment, the application program may be previously installed or stored in the broadcast receiving apparatus 100 when the broadcast receiving apparatus 100 is manufactured, or may be installed in the broadcast receiving apparatus 100 on the basis of application data downloaded from the outside in the future. The application data may for example be downloaded from an application market or the like external server to the broadcast receiving apparatus 100, but not limited thereto. Meanwhile, the processor 201 may be materialized in the form of a device, an S/W module, a circuit, a chip or combination thereof.

The processor 201 may control the tuner 211 to perform a predetermined operation. For example, the processor 201 may control the tuner 211 to be tuned to a predetermined frequency and receive a broadcast signal.

In the broadcast receiving apparatus 100 shown in FIG. 2, both the process and the control are performed in one processor 201, but this is merely an example. According to another exemplary embodiment, the broadcast receiving apparatus 100 may separately include a control unit 1207 in addition to a processing unit as shown in FIG. 12.

Figure 3:
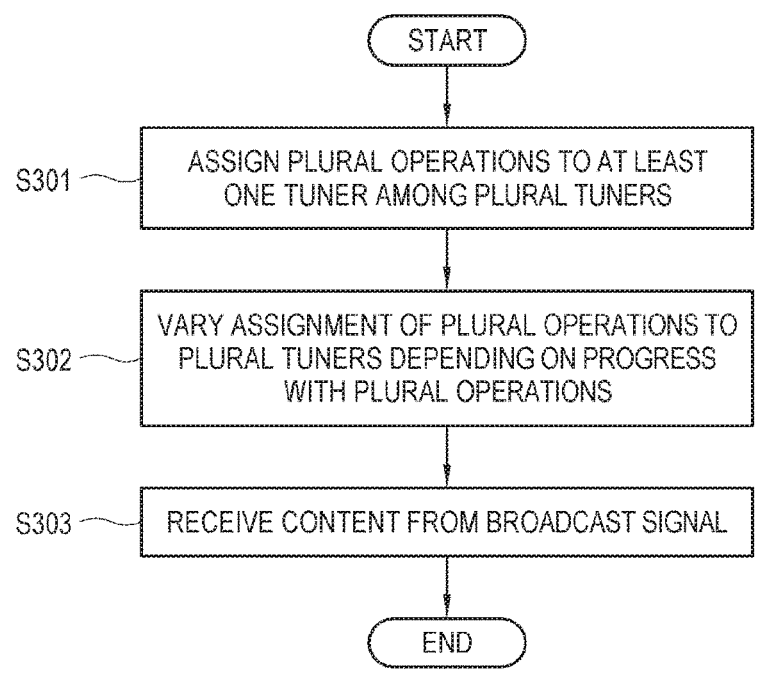
FIG. 3 illustrates a control method of a broadcast receiving apparatus according to one exemplary embodiment.

FIG. 3 illustrates a control method of the broadcast receiving apparatus 100 according to one exemplary embodiment. In the broadcast receiving apparatus 100 according to one exemplary embodiment, the processor 201 controls a plurality of different operations, which are carried out in sequence to receive content contained in a broadcast signal, to be assigned to at least one tuner among the plurality of tuners 211, thereby performing the plurality of operations (S301). Here, the plurality of operations may include any operation as long as it is performed during reception of content contained in the broadcast signal. For example, the plurality of operations may include an operation of scanning a frequency involving a broadcast signal, an operation of receiving the broadcast signal at the frequency determined as involving the broadcast signal, an operation of analyzing the received broadcast signal by parsing or the like method, an operation of receiving content contained the broadcast signal, and so on. However, there are no limits to the plurality of operations.

The content transmitted as contained in the broadcast signal is not limited to a broadcast program. For example, the content contained in the broadcast signal may include update software for updating the software of the broadcast receiving apparatus 100.

Then, the processor 201 controls the assignment of the plurality of operations to the plurality of tuners 211 to be varied depending on progress with the plurality of operations (S302). As an example of controlling the assignment of the plurality of operations to the plurality of tuners 211 to be varied, the processor 201 may change the number of tuners to which a predetermined operation is assigned. For example, the processor 201 may increase or decrease the number of tuners to which a predetermined operation is going to be assigned, may assign a new operation, of which assignment has not been made, to a predetermined tuner, or may undo the assignment of the operation to a predetermined tuner. However, there are no limits to the method of controlling the assignment of the plurality of operations to the plurality of tuners 211.

With this, the processor 201 performs control to receive the content contained in the broadcast signal (S303).

Thus, the operation to be carried out in each tuner is optimized according to conditions, thereby improving the content receiving speed.

As a detailed example, the method of controlling the processor 201 to change the assignment of the plurality of operations to the plurality of tuners 211 is achieved as follows. When the plurality of operations includes a primary operation and a secondary operation performable after the primary operation is completed, the processor 201 makes the primary operation be assigned to and carried out in two or more tuners among the plurality of tuners, and makes the secondary operation be assigned to and carried out in at least one tuner among the plurality of tuners when one of the two or more tuners finishes the primary operation assigned thereto, regardless of whether or not the other tuner of the two or more tuners finishes the primary operation assigned thereto.

Therefore, it is possible to improve a content receiving speed because the secondary operation is immediately performed when there is room for carrying out the secondary operation, without waiting until all the tuners finish the primary operation assigned thereto.

Below, a control method of the broadcast receiving apparatus 100 according to one exemplary embodiment will be described in more detail. For convenience of description, as an example of a plurality of operations for receiving content contained in a broadcast signal, it will be described that a plurality of operations is performed to receive content for upgrading software of the broadcast receiving apparatus 100. However, there are no limits to the content receivable in the broadcast receiving apparatus 100 according to an exemplary embodiment.

Figure 4:
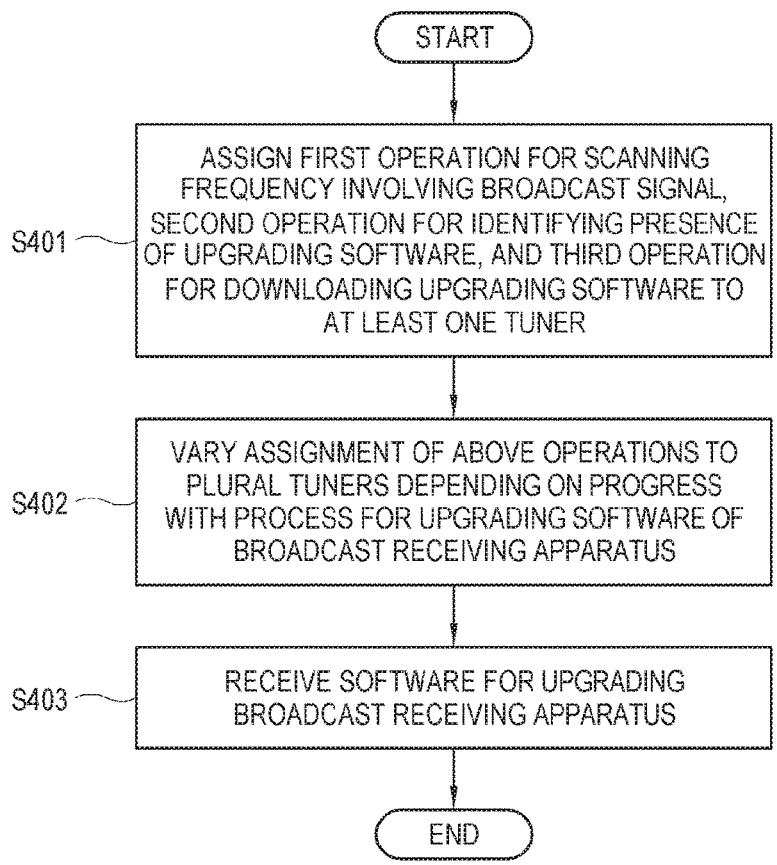
FIG. 4 illustrates a detailed control method of a broadcast receiving apparatus according to one exemplary embodiment.

FIG. 4 illustrates a detailed control method of a broadcast receiving apparatus according to one exemplary embodiment. The processor 201 of the broadcast receiving apparatus 100 according to one exemplary embodiment, which is capable of receiving the content for upgrading the software of the broadcast receiving apparatus 100, assigns at least one among a first operation for scanning a frequency involving a broadcast signal, a second operation for determining whether upgrading software is involved or not at a predetermined frequency, and a third operation for downloading the upgrading software at the predetermined frequency, to at least one of the plurality of tuners (S401). Then, the processor 201 makes the assignment of the operations to the plurality of tuners be varied depending on progress with a process for upgrading the software of the broadcast receiving apparatus 100 (S402), and receives the upgrading software for the broadcast receiving apparatus 100 (S403). In other words, the processor 201 of the broadcast receiving apparatus 100 according to one exemplary embodiment variably assigns the foregoing first to third operations, which are required to be carried out in sequence to receive the content for upgrading the software of the broadcast receiving apparatus 100, to the plurality of tuners according to the progress with the process for upgrading the software of the broadcast receiving apparatus 100, so that the tuners can operate with the best combination thereof at each progress.

Thus, the software upgrading speed for the broadcast receiving apparatus is improved.

There may be various methods of making the assignment of the first to third operations to the plurality of tuners be varied depending on progress with the processes of the processor 201 for upgrading the software of the broadcast receiving apparatus 100. In this regard, descriptions will be made below.

Figure 5:
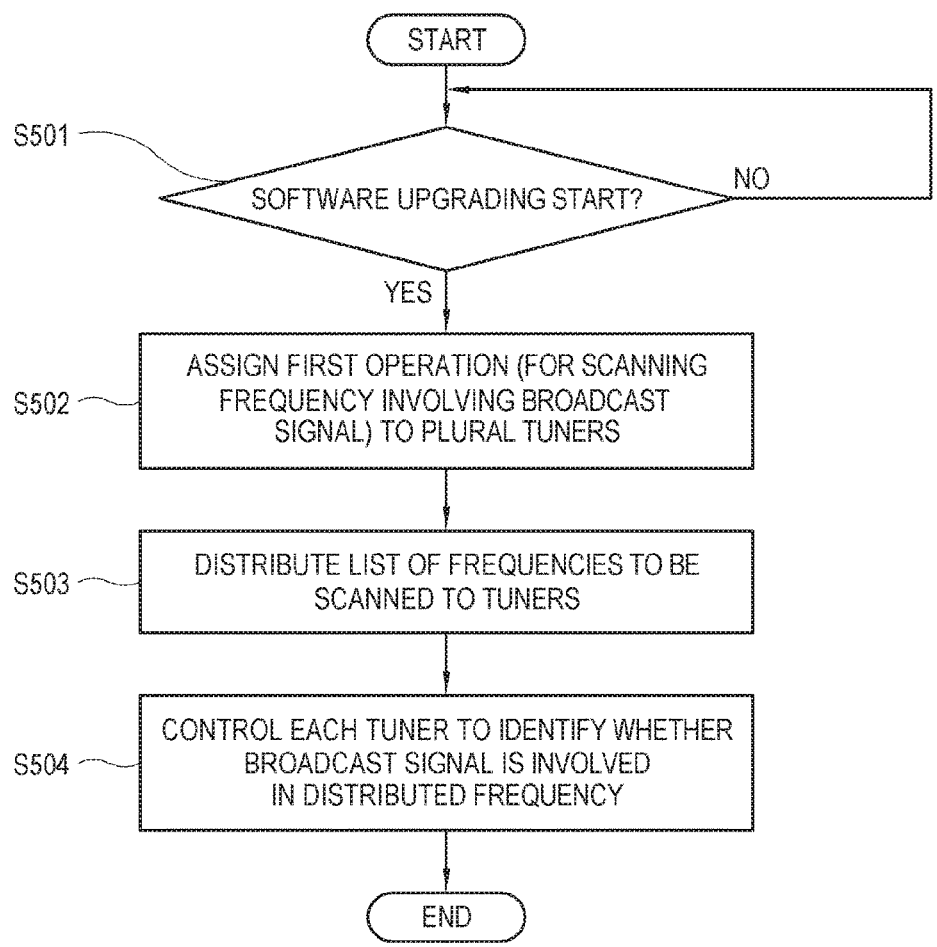
FIG. 5 illustrates operations of a processor in a broadcast receiving apparatus according to one exemplary embodiment.

As one example of the method of making the assignment of the operations to the plurality of tuners be varied depending on the progress with the process for upgrading the software of the broadcast receiving apparatus 100, the processor 201 may assign the first operation to each of a plurality of tuners when software update starts. In this regard, descriptions will be made with reference to FIG. 5.

First, the processor 201 checks whether to start upgrading the software of the broadcast receiving apparatus 100 (S501). For example, the method of determining whether to start upgrading the software of the broadcast receiving apparatus 100 may be based on whether a specific event occurs or not. As an example of the event for determining whether to start upgrading the software, it is determined whether a user command for making a software upgrading request is received, whether a request message is received from the broadcast receiving apparatus 100 by which a broadcast signal is analyzed, whether a predetermined period of time elapses, etc. However, the method of checking whether to start upgrading the software, and the event are not limited to these examples.

When it is determined that there is a need to start upgrading the software of the broadcast receiving apparatus 100, the processor 201 assigns the first operation, i.e. the operation for scanning a frequency involving a broadcast signal, to the plurality of tuners (S502), distributes a list of frequencies to be scanned by the tuners to each tuner (S503), and controls each tuner to check whether the frequencies distributed thereto involve broadcast signals (S504). Here, there are no limits to a method of distributing the list of frequencies to each tuner. For example, when N tuners are present, the processor 201 may equally distribute the list of frequencies by 1/N to each tuner 211. Alternatively, when the tuners are different in process speed, the list may be differentially distributed taking the difference into account, or may be dynamically distributed according to the progress or performance of each tuner.

In other words, when the process for upgrading the software of the broadcast receiving apparatus 100 starts, the processor 201 distributes the list of frequencies to be scanned to all the tuners of the broadcast receiving apparatus 100, and controls each tuner to determine whether the frequencies included in the list distributed thereto involve a broadcast signal. When it is known in advance which frequency band is going to be used for transmitting the software upgrading content, a frequency is scanned with regard to only the known frequency band and content is received through the scanned frequency. On the other hand, when it is not known which frequency band will be used for transmitting the software upgrading content, it is first required to scan frequencies that involve broadcast signals throughout the whole frequency band. This is because the next operations are not performed until after determining the frequencies involving the broadcast signals. Therefore, the processor 201 according to an exemplary embodiment activates all available tuners to scan the frequencies, in which the broadcast signals are present, throughout the whole frequency band.

Figure 6:
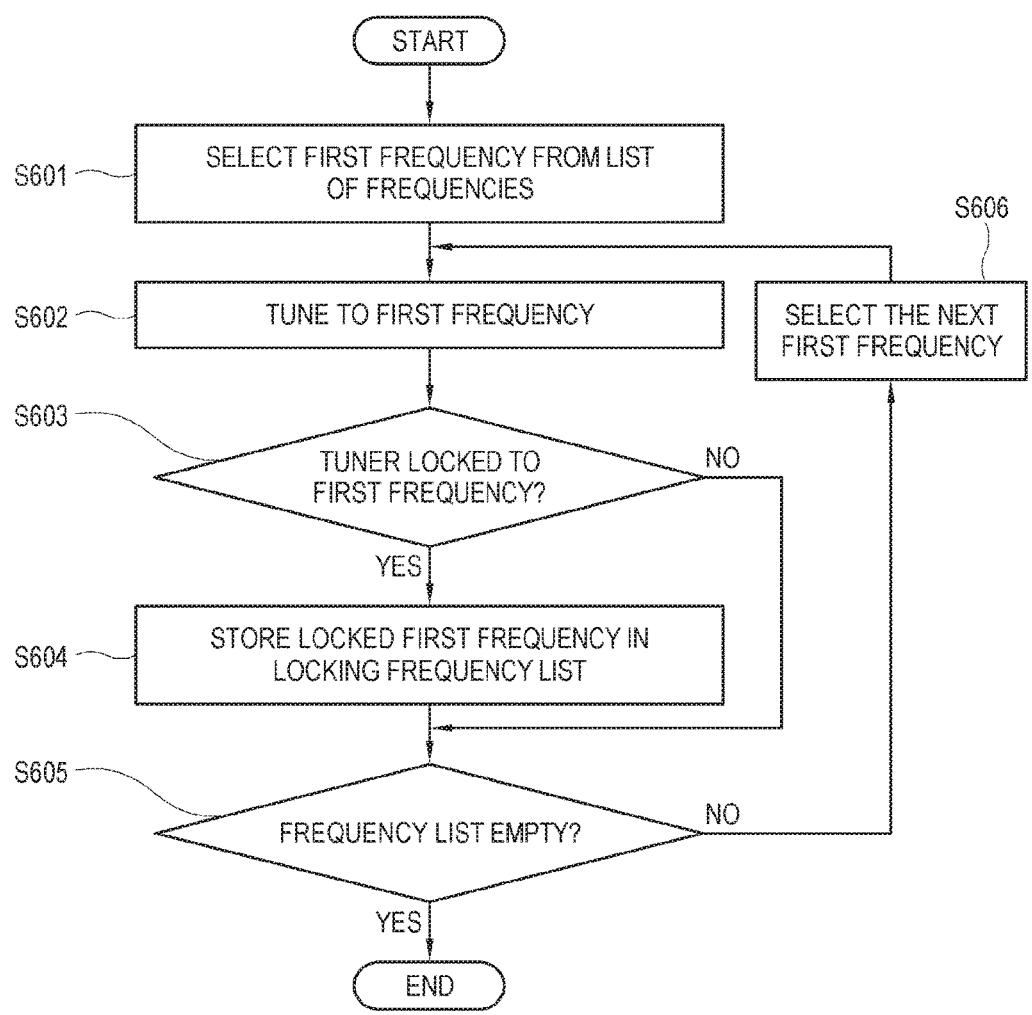
FIG. 6 illustrates a control method of a tuner in a broadcast receiving apparatus according to one exemplary embodiment.

Below, a method of controlling the tuners to which a list of frequencies to be scanned is distributed will be described with reference to FIG. 6. For convenience of description, the method of controlling one among the plurality of tuners, e.g. a first tuner will be described.

The processor 201 selects one frequency in the list of frequencies, i.e. a first frequency distributed to the first tuner (S601), controls the first tuner be tuned to the selected first frequency (S602), and determines whether the first tuner is locked to the first frequency (S603). When it is determined that the first tuner is locked to the first frequency, the processor 201 determines that the first frequency involves a broadcast signal, and stores the first frequency as added to a locking frequency list (S604). Then, the processor 201 checks whether the frequency list is empty or not (S605). When a frequency to be scanned remains in the frequency list, the remaining frequency is subjected to the foregoing operations S602 to S604 like the first frequency.

In other words, the processor 201 determines whether each distributed frequency involves a broadcast signal, and makes the frequency determined as involving the broadcast signal be added as the locking frequency. Thus, it is possible to rapidly scan the frequencies in which the broadcast signals are present.

Figure 7:
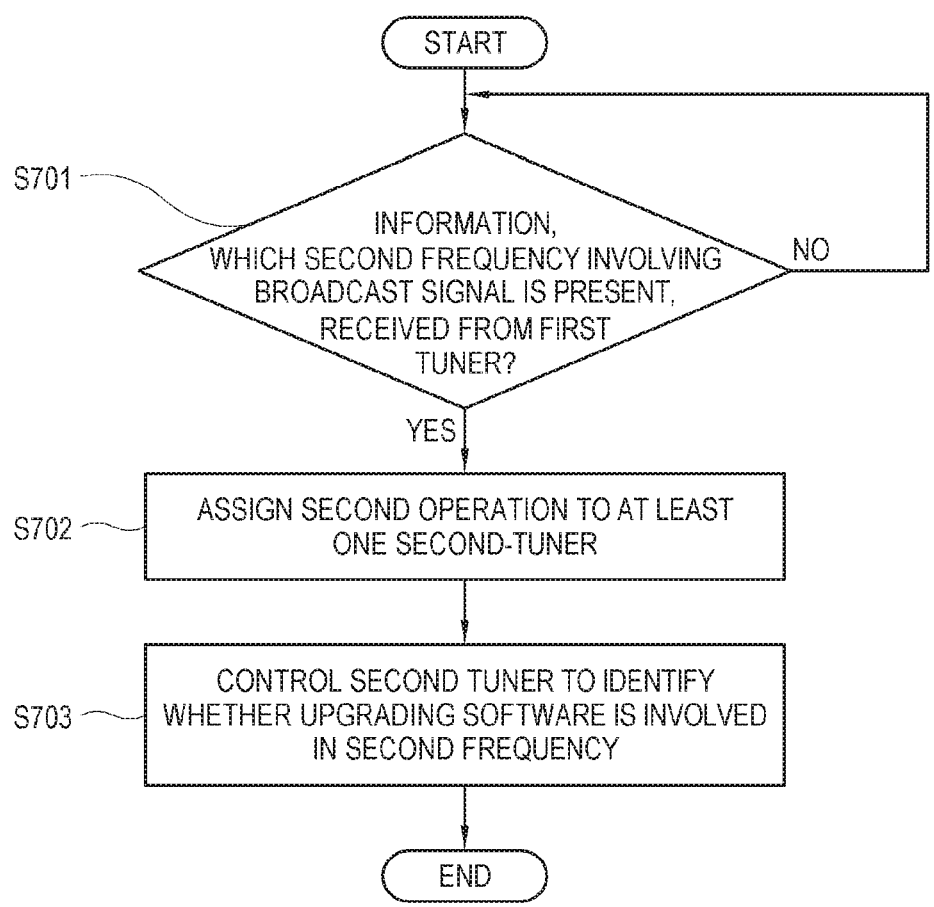
FIG. 7 illustrates operations of a processor in a broadcast receiving apparatus according to another exemplary embodiment.

As another example of the method of making the assignment of the operations to the plurality of tuners be varied depending on the progress with the process for upgrading the software of the broadcast receiving apparatus 100, the processor 201 may assign the second operation to determine whether upgrading software is involved in a scanned frequency in which a broadcast signal is present. In this regard, descriptions will be made with reference to FIG. 7.

The processor 201 determines whether information that a second frequency involving a broadcast signal is present is received from the first tuner to which the first operation is distributed (S701). For example, the processor 201 may determine whether the information that the second frequency involving the broadcast signal is scanned is received, based on information about whether the first tuner is locked to the first frequency (S603) in FIG. 6.

When it is determined that the information that the second frequency involving the broadcast signal is scanned is received from the first tuner to which the first operation is distributed, the processor 201 assigns the second operation to at least one second-tuner (S702), and controls the second tuner to determine whether the second frequency involves the upgrading software (S703).

Therefore, it is possible to improve a speed of a software updating process because the next operation is immediately performed when the frequency involving the broadcast signal is scanned, without waiting until finishing the operation of determining the presence of the broadcast signal with regard to all the frequencies to be scanned.

In terms of assigning the second operation to at least one second-tuner, the processor 201 may use a tuner, which has not been assigned with any operation yet, as the second tuner to which the second operation is going to be assigned, or may use a tuner, which has already been assigned with another operation, as the second tuner to which the second operation is going to be assigned.

Further, the processor 201 may use a tuner, which is different from the first tuner by which the second frequency involving the broadcast signal is scanned, as the second tuner to which the second operation is going to be assigned, or may use the first tuner as the second tuner to which the second operation is going to be assigned. In the latter case, the first tuner, by which the second frequency involving the broadcast signal is scanned, immediately perform the second operation with regard to the second frequency.

In terms of assigning the second operation to at least one second-tuner, the processor 201 may assign the second operation to a single second tuner, or may assign the second operation to a plurality of second tuners. In the latter case, when a plurality of frequencies involving broadcast signals is scanned, the processor 201 may for example make a plurality of tuners for performing the second operation be assigned corresponding to the frequencies. Thus, the presence of the upgrading software is simultaneously checked with regard to the plurality of frequencies determined as involving the broadcast signal, and the speed of the software upgrading process is improved.

When the plurality of second tuners for performing the second operation is assigned, the processor 201 may limit the maximum number of second tuners to be assigned. In general, it takes several milliseconds (ms) to carry out the first operation for scanning a specific frequency involving a broadcast signal, but it takes several seconds (sec) to carry out the second operation for determining whether the upgrading software for the broadcast receiving apparatus 100 is contained in the broadcast signal involved in the specific frequency. In other words, the time taken in performing the second operation is longer than the time taken in performing the first operation. Therefore, the number of second tuners to be assigned is limited to thereby keep a balance of operation time between the first tuner for performing the first operation and the second tuner for performing the second operation subsequent to the first operation. For example, the processor 201 may assign the second operation so that the number of tuners for performing the second operation cannot be greater than the number of tuners for performing the first operation. Thus, an excessive number of second tuners is not assigned to thereby prevent the general software upgrading speed for the broadcast receiving apparatus 100 from being lowered.

Figure 8:
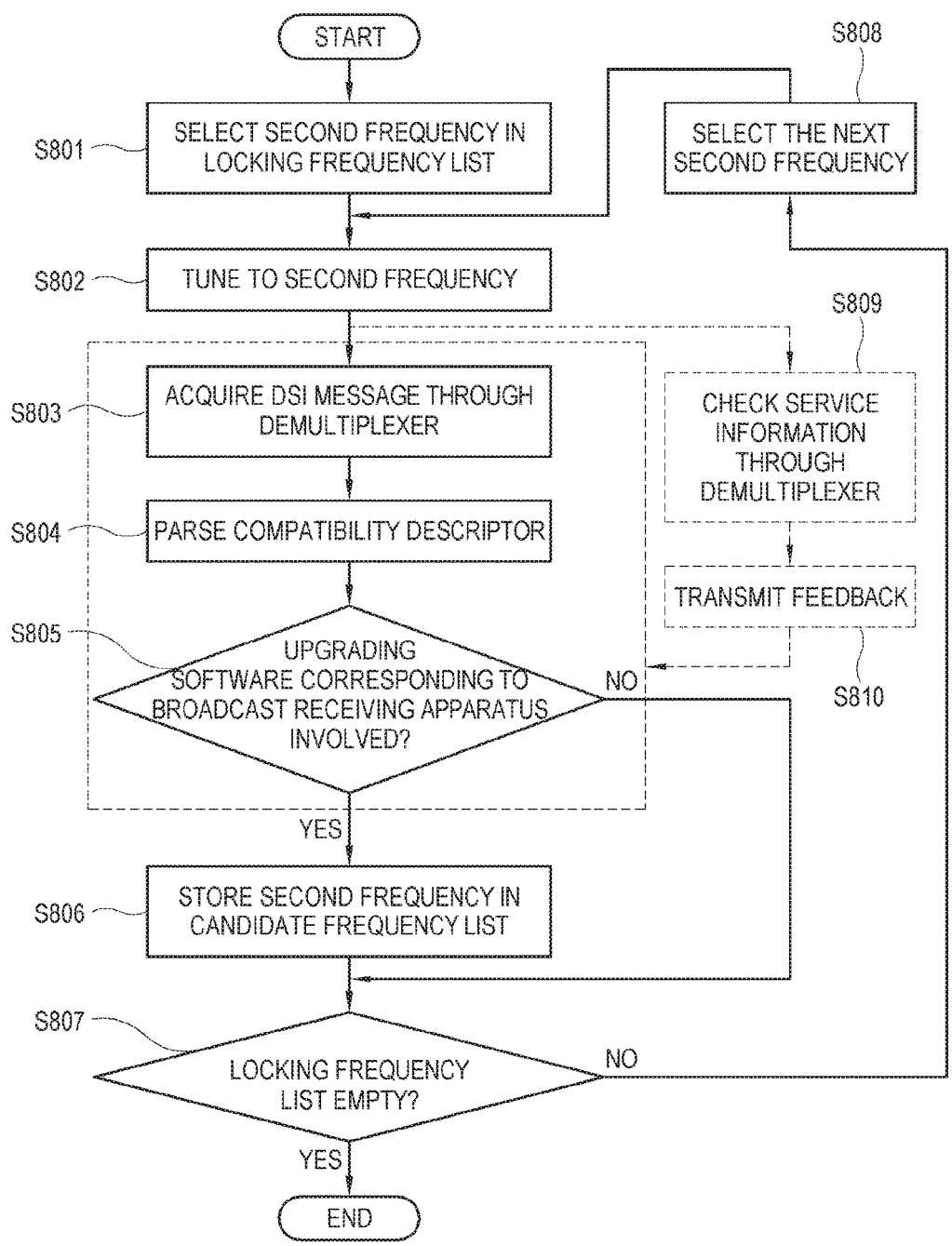
FIG. 8 illustrates a control method of a tuner in a broadcast receiving apparatus according to another exemplary embodiment.

Below, it will be described in detail with reference to FIG. 8 that the second tuner assigned with the second operation determines the presence of the upgrading software with regard to the corresponding frequency.

The processor 201 selects a second frequency from a list of frequencies determined as involving a broadcast signal, i.e. a locking frequency list (S801), and controls the second tuner to be tuned to the second frequency (S802). The processor 201 demodulates a signal received in the second tuner at the second frequency into a transport stream, and demultiplexes the transport stream to acquire a download service initiative (DSI) message (S803). Further, the processor 201 parses a compatibility descriptor of the DSI message (S804), and determines whether the upgrading software for the broadcast receiving apparatus 100 is present in the broadcast signal received at the second frequency (S805). When it is determined that the upgrading software for the broadcast receiving apparatus 100 is involved in the second frequency, the processor 201 adds this second frequency to a candidate frequency list (i.e. a list of frequencies determined as involving the upgrading software (S806). Then, the processor 201 checks whether the locking frequency list is empty (S807). When a frequency to be analyzed remains in the locking frequency list, the processor 201 regards this remaining frequency as the second frequency and repeats the foregoing operations S802~S806.

Further, the processor 201 may use additional information to improve speed of determining whether the second frequency involves the upgrading software. Specifically, the processor 201 checks service information through the demultiplexer (S809), and gives a feedback on this service information (S810) to the operations of determining the presence of the upgrading software (S803~S805), thereby improving the speed of determining whether the second frequency involves the upgrading software.

For example, when the broadcast signal complies with the advanced television system committee (ATSC) standards, the processor 201 checks values (e.g. service type: 0x05, stream type: 0x0B on a virtual channel table (VCT) included in a program and system information protocol (PSIP), and determines whether the corresponding frequency is a channel for a software download data service (SDDS). When the values of the corresponding type are not present, the processor 201 determines that the corresponding frequency does not involve upgrading software, stops the operations S803~S804 of receiving and parsing the DSI message, and determines whether the next frequency in the locking frequency list involves the upgrading software.

Alternatively, when the broadcast signal complies with digital video broadcasting (DVB) standards, the processor 201 parses a delivery system descriptor of a network information table (NIT), and obtains information (e.g. tuning parameter information) about a frequency, modulation information, etc. With this, it is possible to determine whether the transport stream is transmitted at this frequency, and therefore the processor 201 adds this frequency to the locking frequency list, thereby making the added frequency be subjected to the determination for the presence of the upgrading software.

Figure 9:
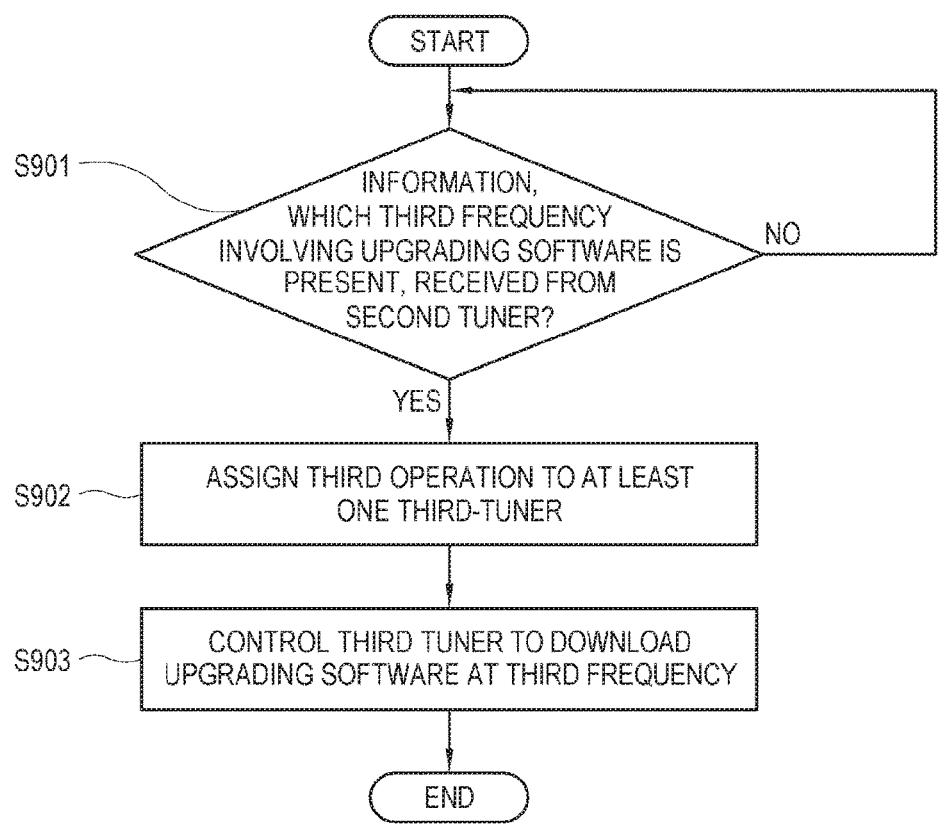
FIG. 9 illustrates operations of a processor in a broadcast receiving apparatus according to still another exemplary embodiment.

As still another example of the method of making the assignment of the operations to the plurality of tuners be varied depending on the progress with the process for upgrading the software of the broadcast receiving apparatus 100, the processor 201 may the third operation to download upgrading software at a frequency when the frequency involving the upgrading software for the broadcast receiving apparatus 100 is scanned. In this regard, descriptions will be made with reference to FIG. 9.

The processor 201 determines whether information that a third frequency involving the upgrading software is present is received from the second tuner to which the second operation is distributed (S901). For example, the processor 201 may determine whether the information that the third frequency involving the upgrading software is scanned is received, based on information about whether the upgrading software for the broadcast receiving apparatus is involved (S805) in FIG. 8.

When it is determined that the information that the third frequency involving the upgrading software is scanned is received from the second tuner to which the second operation is distributed, the processor 201 assigns the third operation to at least one third-tuner (S902), and controls the third tuner to download the upgrading software at the third frequency (S903).

Therefore, it is possible to improve a speed of a software updating process because the next operation is immediately performed when the frequency involving the upgrading software is scanned, without waiting until finishing the operation of determining the presence of the upgrading software with regard to all the frequencies on the locking frequency list.

In terms of assigning the third operation to at least one third-tuner, the processor 201 may use a tuner, which has not been assigned with any operation yet, as the third tuner to which the third operation is going to be assigned, or may use a tuner, which has already been assigned with another operation, as the third tuner to which the third operation is going to be assigned.

Further, the processor 201 may use a tuner, which is different from the second tuner by which the third frequency involving the upgrading software is scanned, as the third tuner to which the third operation is going to be assigned, or may use the second tuner as the third tuner to which the third operation is going to be assigned. In the latter case, the second tuner, by which the third frequency involving the upgrading software is scanned, immediately perform the third operation with regard to the third frequency.

In terms of assigning the third operation to at least one third-tuner, the processor 201 may assign the third operation to a single third tuner, or may assign the third operation to a plurality of third tuners. In the latter case, when a plurality of frequencies involving upgrading software is scanned, the processor 201 may for example make a plurality of tuners for performing the third operation be assigned corresponding to the frequencies. Thus, the upgrading software is simultaneously downloaded from the plurality of frequencies determined as involving the upgrading software. In this case, when an error occurs in a certain downloaded file, another downloaded file may be executed to upgrade the software, and therefore the speed of the software upgrading process is improved.

Meanwhile, the processor 201 may limit the maximum number of third tuner to be assigned. In general, it takes several seconds (sec) to carry out the second operation for determining whether a broadcast signal involved in a specific frequency contains the upgrading software for the broadcast receiving apparatus 100, but it takes several minutes to carry out the third operation for downloading the upgrading software at the frequency determined as involving the upgrading software. In other words, the time taken in performing the third operation is longer than the time taken in performing the second operation. Therefore, the number of third tuners to be assigned is limited to thereby keep a balance of operation time between the second tuner for performing the second operation and the third tuner for performing the third operation subsequent to the second operation. For example, the processor 201 may limit the maximum number of third tuners to be assigned to one. When an error is much less likely to occur while downloading the upgrading software, it may be efficient to limit the maximum number of third tuners to one. Alternatively, the processor 201 may make the number of third tuners not be greater than the number of first or second tuners. Thus, an excessive number of third tuners is not assigned to thereby prevent the general software upgrading speed for the broadcast receiving apparatus 100 from being lowered.

Figure 10:
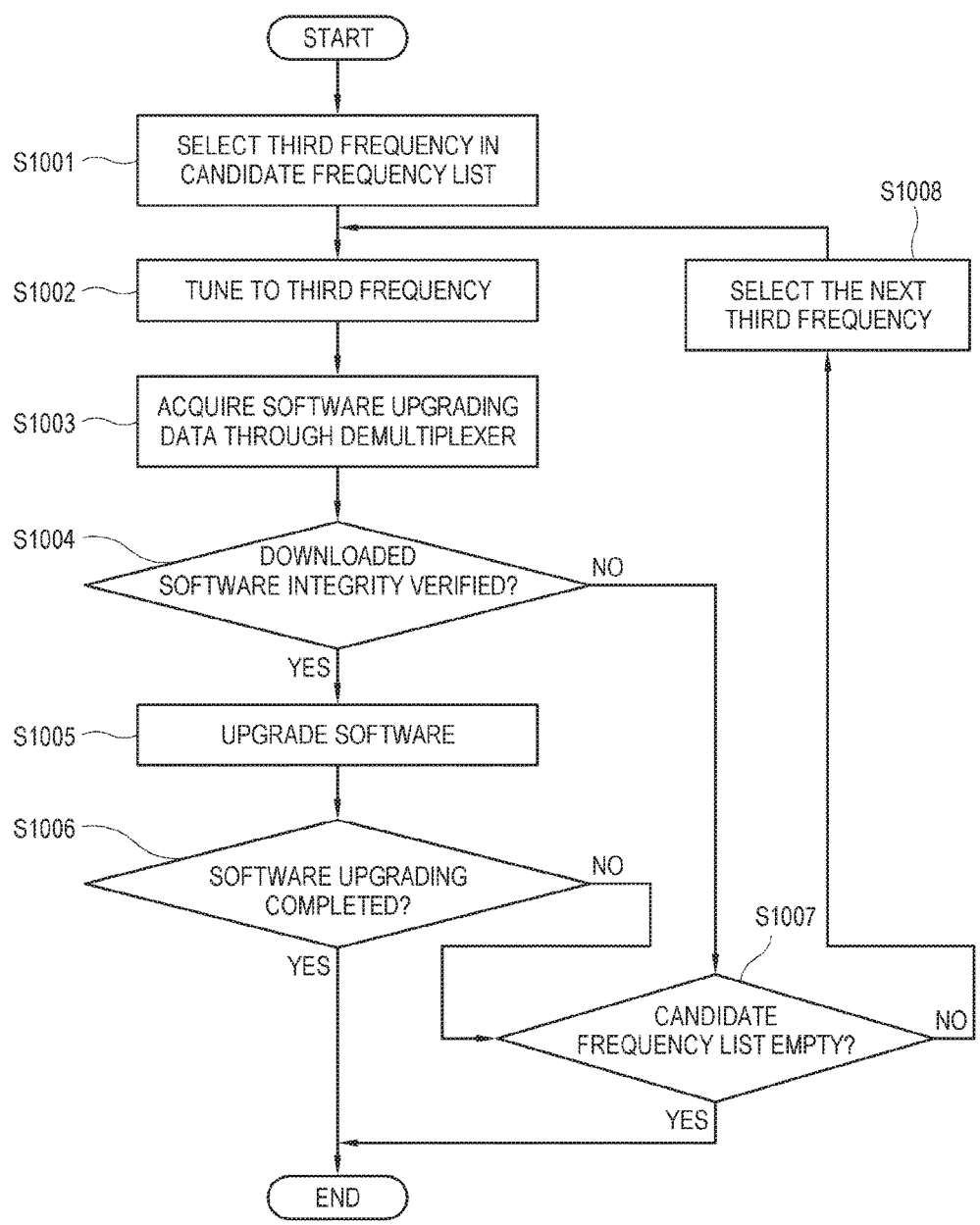
FIG. 10 illustrates a control method of a tuner in a broadcast receiving apparatus according to still another exemplary embodiment.

Below, it will be described in detail with reference to FIG. 10 that the third tuner assigned with the third operation downloads the upgrading software at the corresponding frequency.

The processor 201 selects a third frequency from a list of frequencies determined as involving upgrading software, i.e. a candidate frequency list (S1001), and controls the third tuner to be tuned to the selected third frequency (S1002). The processor 201 demodulates a signal received in the third tuner at the third frequency into a transport stream, and demultiplexes the transport stream to download the upgrading software corresponding to the broadcast receiving apparatus 100 and acquire data (S1003). In this case, as described above with reference to FIG. 8, when the processes of demodulating the signal received at the second frequency, which is the same as the third frequency, into the transport stream, and demultiplexing the transport stream have already been performed, the processor 201 may use the previously processed results again without repeating the foregoing processes.

When the upgrading software is completely downloaded, the processor 201 verifies the integrity of the downloaded upgrading software (S1004), and upgrades the software for the broadcast receiving apparatus 100 when the integrity is verified (S1005). When the software upgrading is not normally completed or when the integrity of the downloaded software is not verified, the processor 201 determines whether the candidate frequency list is empty (S1007). When a frequency to be targeted remains in the candidate frequency list, the processor 201 regards this remaining frequency as the third frequency and repeats the foregoing operations S1002~S1006.

Thus, the software is immediately downloaded at the very moment when the information about the frequency involving the upgrading software corresponding to the broadcast receiving apparatus 100 is acquired. Further, the scanning for the remaining frequency band is simultaneously in progress even while downloading the software. Therefore, when there is a problem with the downloaded software data, it is possible to rapidly switch over to another frequency for downloading the software. Accordingly, the software upgrading process is improved in speed.

Each of the foregoing embodiments individually describes that the processor 201 distributes the first operation, the second operation or the third operation to at least one tuner. However, the plurality of tuners capable of performing the operations respectively assigned thereto may compete with one another. For example, the assignment of the second operation to at least one tuner and the assignment of the third operation to at least one tuner may be required at the same time. In this case, the processor 201 has to determine which operation among them will be preferentially assigned.

Alternatively, a new operation may be needed to be assigned to at least one tuner. In this case, when all the tuners are performing the operations previously assigned thereto and thus there are no tuners to which any operation is not assigned (hereinafter, referred to as 'unassigned tuner), or when the number of unassigned tuners is fewer than the number of tuners needed to be assigned with the operations, a tuner previously assigned with a predetermined operation needs to be changed to perform another operation. Therefore, the processor 201 has to determine whether to make a tuner previously assigned with a predetermined operation be changed to be assigned with a new operation, determine which tuner among the previously assigned tuners will be assigned with the new operation, determine which operation among the new operations will be preferentially assigned to the determined tuner when many new operations compete with one another, and so on.

Figure 11:
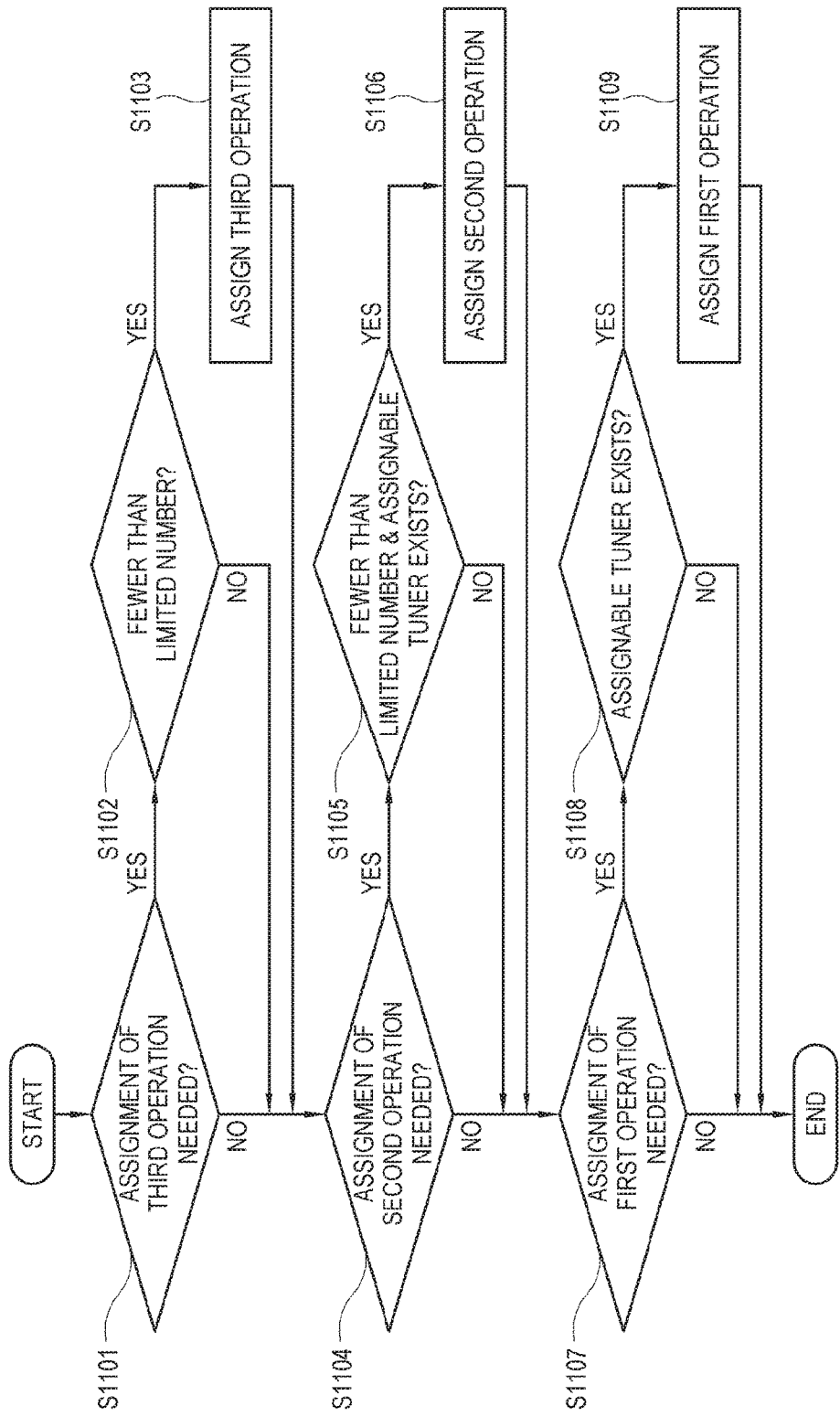
FIG. 11 illustrates operations of a processor in a broadcast receiving apparatus according to yet another exemplary embodiment.

In this regard, an exemplary embodiment will be described with reference to FIG. 11. FIG. 11 illustrates operations of the processor 201 in the broadcast receiving apparatus 100 according to yet another exemplary embodiment.

The processor 201 of the broadcast receiving apparatus 100 according to this exemplary embodiment may assign the third operation to at least one among the plurality of tuners when a frequency involving the upgrading software corresponding to the broadcast receiving apparatus 100 is scanned. For example, when there is a need of assigning the third operation to at least one tuner, the processor 201 may assign the third operation with a higher priority than the other operations even though not the third operation but the first or second operation needs to be assigned to the at least one tuner at the same time. Although there are no unassigned tuners among the plurality of tuners of the broadcast receiving apparatus 100, the processor 201 may make the tuner switch over the first or second operation previously assigned thereto to the third operation. When a plurality of frequencies involving the upgrading software corresponding to the broadcast receiving apparatus 100 is present and the software of the broadcast receiving apparatus 100 is completely updated with the upgrading software downloaded at only one frequency among them, the operations of downloading the upgrading software at the other frequencies are not required any more. Therefore, the processor 201 makes the third operation for directly downloading the upgrading software be assigned with a top property, and thus improves the speed of the software upgrading process.

To this end, the processor 201 first determines whether the assignment of the third operation is needed (S1101) before determining whether the assignment of the first or second operation is needed (S1104 or S1107). With this, the processor 201 may assign the third operation with a higher priority than the other operations to the tuner. Thus, the assignment of the third operation for directly downloading the upgrading software is a top priority, thereby improving the speed of the software upgrading process.

Further, the processor 201 may determine whether the number of third operations that have already been assigned is smaller than a limited number even when there is a need of assigning the third operation (S1102), and assign the third operation only when it is determined that the number of third operations is smaller than the limited number (S1103). Thus, as described above with reference to FIG. 9, an excessive number of third tuners is not assigned to thereby prevent the general software upgrading speed for the broadcast receiving apparatus 100 from being lowered.

Next, the processor 201 determines whether there is a need of assigning the second operation (S1104), and assigns the second operation as necessary. Thus, the processor 201 preferentially assigns the second operation for determining whether the upgrading software is involved in the frequency, rather than the first operation for determining whether the broadcast signal is involved in the frequency, thereby improving the speed of the software upgrading process.

Further, even when there is a need of assigning the second operation, the processor 201 determines whether the number of second operations that have already been assigned is smaller than a limited number and whether the tuner to be assignable is present (S1105), and assigns the second operation only when the number of second operations is smaller than the limited number and when the tuner to be assignable is present (for example, when there is an unassigned tuner or when there is a tuner to which the first operation is assigned) (S1106). Thus, as described above with reference to FIG. 7, the number of second tuners is not excessively assigned to thereby prevent the general software upgrading speed for the broadcast receiving apparatus 100 from being lowered, and the order of priority is maintained so that the assignment of the third tuner can be followed by the assignment of the second tuner.

Next, the processor 201 may determine whether there is a need of assigning the first operation (S1107), and assign the first operation (S1109) only when there is a need of assigning the first operation and when there is a tuner to which the first operation is assignable, for example, there is an unassigned tuner (S1108). Thus, the operations are assigned to the tuner in order of the third operation, the second operation, and the first operation, thereby improving the speed of the software upgrading process. However, the foregoing description is merely an example of assigning the operations to the plurality of tuners according to priorities, but there are no limits to the priorities between the assignments or factors to be taken into account at the assignment.

As described above, in the processes of upgrading the software of the broadcast receiving apparatus 100 according to various exemplary embodiments, the processor 201 assigns operations to at least one among the plurality of tuners only when the operations are needed to be carried out, i.e. dynamically assigns the operations to the tuners based on the progress with the process for upgrading the software of the broadcast receiving apparatus 100, thereby improving the software upgrading speed.

During the dynamic assignment, when one or more operations are assigned to the plurality of tuners in the broadcast receiving apparatus 100, the operations may be simultaneously carried out in parallel. For example, as shown in FIG. 12, when the broadcast receiving apparatus 100 includes six tuners 1201-1206, first to third tuners 1201-1203 are used in scanning broadcast signals involved in frequencies respectively distributed thereto, at the same time fourth and fifth tuners 1204-1205 are used in determining whether upgrading software is involved in each frequency determined as involving the broadcast signal, and at the same time a sixth tuner 1206 is used in downloading software at the frequency determined as involving the upgrading software.

Meanwhile, the foregoing exemplary embodiments respectively describe the examples of the method of making the assignment of the operations to the plurality of tuners be varied depending on the progress with the plurality of operations, in more detail, depending on the progress with the process for upgrading the software of the broadcasting receiving apparatus, the examples including: (1) the method of assigning the first operation (for scanning the frequency involving the broadcast signal) to the plurality of tuners when the software upgrading process starts, (2) the method of assigning the second operation (for determining the presence of the upgrading software) when the first tuner scans the frequency involving the broadcast signal, and (3) the method of assigning the third operation when the frequency involving the upgrading software for the broadcast receiving apparatus is scanned.

Here, the foregoing methods are not mutually exclusive. In other words, two or more among the foregoing methods (1), (2) and (3) may be combined to achieve another embodiment. One among the combined methods will be described with reference to FIG. 13.

For example, when the broadcast receiving apparatus 100 includes a total of six tuners, the processor 201 of the broadcast receiving apparatus 100 assigns the first operation to all the six tuners when the software upgrading for the broadcast receiving apparatus 100 starts (t1) (1301), and thus controls all the tuners to first scan frequencies involving broadcast signals within the frequency list.

When there is a frequency involving the broadcast signal, the processor 201 assigns the second operation to at least one tuner, thereby performing control to determine whether the upgrading software corresponding to the broadcast receiving apparatus 100 is involved in the frequency determined as involving the broadcast signal (t2). Although there are no specific limits to the tuner, to which the second operation is going to be assigned, among the plurality of tuners, FIG. 13 illustrates an example that the second operation is assigned to the identical tuners 1311 and 1312 by which the frequency involving the broadcast signal is scanned, so that the identical tuner that scans the frequency involving the broadcast signal can directly determine whether the upgrading software is involved in the scanned frequency.

Then, when a frequency involving the upgrading software corresponding to the broadcast receiving apparatus 100 is present among the frequencies determined as involving the broadcast signal (t3), the processor 201 assigns the third operation to at least one tuner, thereby performing control to download the upgrading software at the frequency involving the upgrading software corresponding to the broadcast receiving apparatus 100. Although there are no specific limits to the tuner, to which the third operation is going to be assigned, among the plurality of tuners, FIG. 13 illustrates an example that the third operation is assigned to the identical tuner 1321 by which the presence of the upgrading software is determined, so that the identical tuner that determines the presence of the upgrading software can directly download the upgrading software at the determined frequency.

Next, the tuner assigned with the third operation performs upgrading the software for the broadcast receiving apparatus 100 with the downloaded software, and the software upgrading for the broadcast receiving apparatus 100 is completed.

Thus, the plurality of tuners is used in parallel, thereby improving the speed of the process for receiving content contained in the broadcast signal. Further, the operations to be assigned to the tuners are properly controlled to be varied depending on the plurality of operations or the progress with the process for receiving the content contained in the broadcast signal, so that the plurality of operations to be performed in sequence can be immediately carried out without any wasteful standby time, thereby further improving the speed of the process for receiving the content contained in the broadcast signal.

As described above, according to exemplary embodiment, a plurality of tuners are more efficiently utilized to thereby improve a speed of a process for receiving content contained in a broadcast signal.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcast receiving apparatus comprising:
  a plurality of tuners, each tuner of the plurality of tuners configured to be tuned to receive a broadcast signal; and
  at least one processor configured to:
    assign a plurality of operations to be performed in the plurality of tuners, the plurality of operations being different from one another and being performed in sequence to receive content from the broadcast signal,
    vary the assignment of the plurality of operations to be performed in the plurality of tuners depending on a progress of the plurality of operations, and
    receive the content from the broadcast signal.

2. The broadcast receiving apparatus according to claim 1, wherein the plurality of operations comprises a primary operation and a secondary operation performable after the primary operation is completed, and
  the at least one processor is configured to assign the primary operation to two or more tuners, and assign the secondary operation to at least one tuner of the two or more tuners based on a first tuner of the two or more tuners finishing the assigned primary operation, regardless of whether or not a second tuner of the two or more tuners has finished the assigned primary operation.

3. The broadcast receiving apparatus according to claim 1, wherein
  the content comprises upgrading software for the broadcast receiving apparatus, and
  the plurality of operations comprises at least one operation among a first operation for scanning a frequency involving the broadcast signal, a second operation for identifying whether the upgrading software is included in a predetermined frequency, and a third operation for downloading the upgrading software at the predetermined frequency.

4. The broadcast receiving apparatus according to claim 3, wherein the at least one processor assigns the first operation to the plurality of tuners based on software upgrading being started.

5. The broadcast receiving apparatus according to claim 3, wherein the at least one processor assigns the second operation to a first tuner among the plurality of tuners based on a frequency involving the broadcast signal being scanned by the first tuner.

6. The broadcast receiving apparatus according to claim 3, wherein the at least one processor assigns the plurality of operations to the plurality of tuners so that a number of tuners assigned with the second operation is less than a number of tuners assigned with the first operation.

7. The broadcast receiving apparatus according to claim 3, wherein the at least one processor assigns the third operation to at least one tuner among the plurality of tuners based on a frequency involving the upgrading software corresponding to the broadcast receiving apparatus being present.

8. The broadcast receiving apparatus according to claim 1, wherein the at least one processor varies the plurality of operations to the plurality of tuners depending on a progress with software upgrading for the broadcast receiving apparatus.

9. The broadcast receiving apparatus according to claim 1, wherein the at least one processor controls the plurality of operations assigned to the plurality of tuners to be carried out in parallel.

10. A method of controlling a broadcast receiving apparatus with a plurality of tuners, each tuner of the plurality of tuners configured to be tuned to receive a broadcast signal, the method comprising:
performing, by at least one processor of the broadcast receiving apparatus, operations including:
assigning a plurality of operations, which are different from one another and performed in sequence to receive content from the broadcast signal, to the plurality of tuners;
varying the assignment of the plurality of operations to the plurality of tuners depending on a progress of the plurality of operations; and
receiving the content from the broadcast signal.

11. The method according to claim 10, wherein
the plurality of operations comprises a primary operation and a secondary operation performable after the primary operation is completed,
the assigning comprises assigning the primary operation to two or more tuners,
the varying comprises assigning the secondary operation to at least one tuner of the two or more tuners based on a first tuner of the two or more tuners finishing the assigned primary operation, regardless of whether or not a second tuner of the two or more tuners has finished the assigned primary operation.

12. The method according to claim 10, wherein
the content comprises upgrading software for the broadcast receiving apparatus, and
the plurality of operations comprises at least one operation among a first operation for scanning a frequency involving the broadcast signal, a second operation for identifying whether the upgrading software is included in a predetermined frequency, and a third operation for downloading the upgrading software at the predetermined frequency.

13. The method according to claim 12, wherein the varying comprises assigning the first operation to the plurality of tuners based on software upgrading being started.

14. The method according to claim 12, wherein the varying comprises assigning the plurality of operations to the plurality of tuners so that a number of tuners assigned with the second operation is less than a number of tuners assigned with the first operation.

15. The method according to claim 12, wherein the varying comprises assigning the third operation to at least one tuner among the plurality of tuners based on a frequency involving the upgrading software corresponding to the broadcast receiving apparatus being present.

16. The method according to claim 10, wherein the varying comprises varying the assignment of the plurality of operations to the plurality of tuners depending on a progress with software upgrading for the broadcast receiving apparatus.

17. The method according to claim 10, wherein the varying comprises assigning the second operation to a first tuner among the plurality of tuners based on a frequency involving the broadcast signal being scanned by the first tuner.

18. The method according to claim 10, wherein the control comprises controlling the plurality of operations assigned to the plurality of tuners to be carried out in parallel.

19. A computer program product comprising a non-transitory computer readable storage medium having a computer program stored thereon, which, when executed by a computing device, causes the computing device to execute the method of claim 10.

20. The computer program product according to claim 19,
wherein the computer program is stored in the non-transitory computer readable storage medium in a server, and
wherein the computer program is downloadable over a network to the computing device.

* * * * *